(12) United States Patent
Ide et al.

(10) Patent No.: US 12,476,573 B2
(45) Date of Patent: Nov. 18, 2025

(54) MOTOR CONTROL APPARATUS

(71) Applicant: SANYO DENKI CO., LTD., Tokyo (JP)

(72) Inventors: Yuji Ide, Tokyo (JP); Michio Kitahara, Tokyo (JP); Shunichi Miyazaki, Tokyo (JP); Toshio Hiraide, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 182 days.

(21) Appl. No.: 18/475,366

(22) Filed: Sep. 27, 2023

(65) Prior Publication Data

US 2024/0113648 A1 Apr. 4, 2024

(30) Foreign Application Priority Data

Sep. 30, 2022 (JP) ................. 2022-158152

(51) Int. Cl.
*H02P 27/08* (2006.01)
*H02P 29/60* (2016.01)

(52) U.S. Cl.
CPC .............. *H02P 27/08* (2013.01); *H02P 29/60* (2016.02)

(58) Field of Classification Search
CPC .. H02P 3/14; H02P 27/08; H02P 29/60; H02P 2201/15
See application file for complete search history.

(56) References Cited

FOREIGN PATENT DOCUMENTS

JP 60-5791 A 1/1985
PH 12015000334 A1 * 10/2017 ............... H02H 3/32

\* cited by examiner

*Primary Examiner* — Said Bouziane
(74) *Attorney, Agent, or Firm* — RANKIN, HILL & CLARK LLP

(57) ABSTRACT

A motor control apparatus includes: a converter circuit; an inverter circuit; a current detector; a regenerative resistor; a regenerative resistor controller; and a control device. The converter circuit converts alternating current from an alternating current power supply to direct current, converts regenerative direct current from the inverter circuit to regenerative alternating current, and further supplies the regenerative alternating current to the alternating power supply. The inverter circuit converts the direct current to alternating current for driving a motor, and converts regenerative alternating current from the motor to the regenerative direct current. The regenerative direct current from the inverter circuit passes through the resistor. The regenerative direct current passes thorough the resistor upon the current detector detecting the regenerative current exceeding a predetermined value. The control device limits torque or speed of the motor upon the temperature and/or power consumption of the resistor exceeding a threshold.

7 Claims, 2 Drawing Sheets

MOTOR CONTROL APPARATUS

CROSS-REFERENCE TO RELATED APPLICATION

This application is based on Japanese Patent Application No. 2022-158152 filed with the Japan Patent Office on Sep. 30, 2022, the entire content of which is hereby incorporated by reference.

BACKGROUND

1. Technical Field

The present disclosure relates to a motor control apparatus.

2. Related Art

A technology is known which, when a regenerative current becomes an overcurrent in a motor control apparatus with a power regeneration function that supplies an alternating current regenerated by a motor to a power supply, avoids breakdown of a circuit component in the motor control apparatus due to the overcurrent.

For example, JP-A-60-5791 discloses a motor control apparatus with a power regeneration function that detects an overcurrent of a regenerative current and reduces a motor torque reference according to the current value of the overcurrent. The motor control apparatus avoids breakdown of a circuit component due to the overcurrent of the regenerative current. JP-A-60-5791 particularly discloses a motor control apparatus with a multi-axis configuration as such a motor control apparatus with a power regeneration function. In the motor control apparatus with the multi-axis configuration, many inverters are connected to one converter.

However, excessive regenerative current may be returned only for an instant depending on the operating pattern of each axis while the motor control apparatus with the multi-axis configuration is used. However, in the method disclosed in JP-A-60-5791, torque is limited also by the instantaneous excessive regenerative power. Hence, the decelerating time increases, so that there is a problem that the takt time of a machine increases.

Hence, according to the embodiment, a motor control apparatus is provided which includes a protection function against excessive regenerative power. According to the motor control apparatus, it is possible to restrain the accelerating/decelerating time of a motor from increasing as much as possible. Hence, it is possible to continue normal operation as long as possible. As a result, it is possible to restrain the takt time of a machine from increasing as much as possible.

SUMMARY

A motor control apparatus with a power regeneration function according to the embodiment includes: a converter circuit; an inverter circuit; a current detector; a regenerative resistor; a regenerative resistor controller; and a control device, in which: the converter circuit is configured to convert alternating current from an alternating current power supply to direct current, convert regenerative direct current from the inverter circuit to regenerative alternating current, and further supply the regenerative alternating current to the alternating current power supply: the inverter circuit is configured to convert the direct current to alternating current for driving a motor, and convert regenerative alternating current from the motor to the regenerative direct current; the current detector is configured to be capable of detecting the regenerative alternating current to be supplied to the alternating current power supply; the regenerative resistor is configured to pass a part of the regenerative direct current from the inverter circuit therethrough; the regenerative resistor controller is configured to control the passage of the regenerative direct current through the regenerative resistor; the control device is configured to control drive of the motor; and the motor control apparatus is configured to cause the regenerative resistor controller to pass the regenerative direct current thorough the regenerative resistor upon the current detector detecting that the regenerative current exceeds a predetermined current value, and cause the control device to limit torque in a regeneration direction of the motor, or a rate of change of a speed command in the regeneration direction of the motor upon at least one of the temperature or power consumption of the regenerative resistor exceeding a threshold.

DETAILED DESCRIPTION

Figure 1:
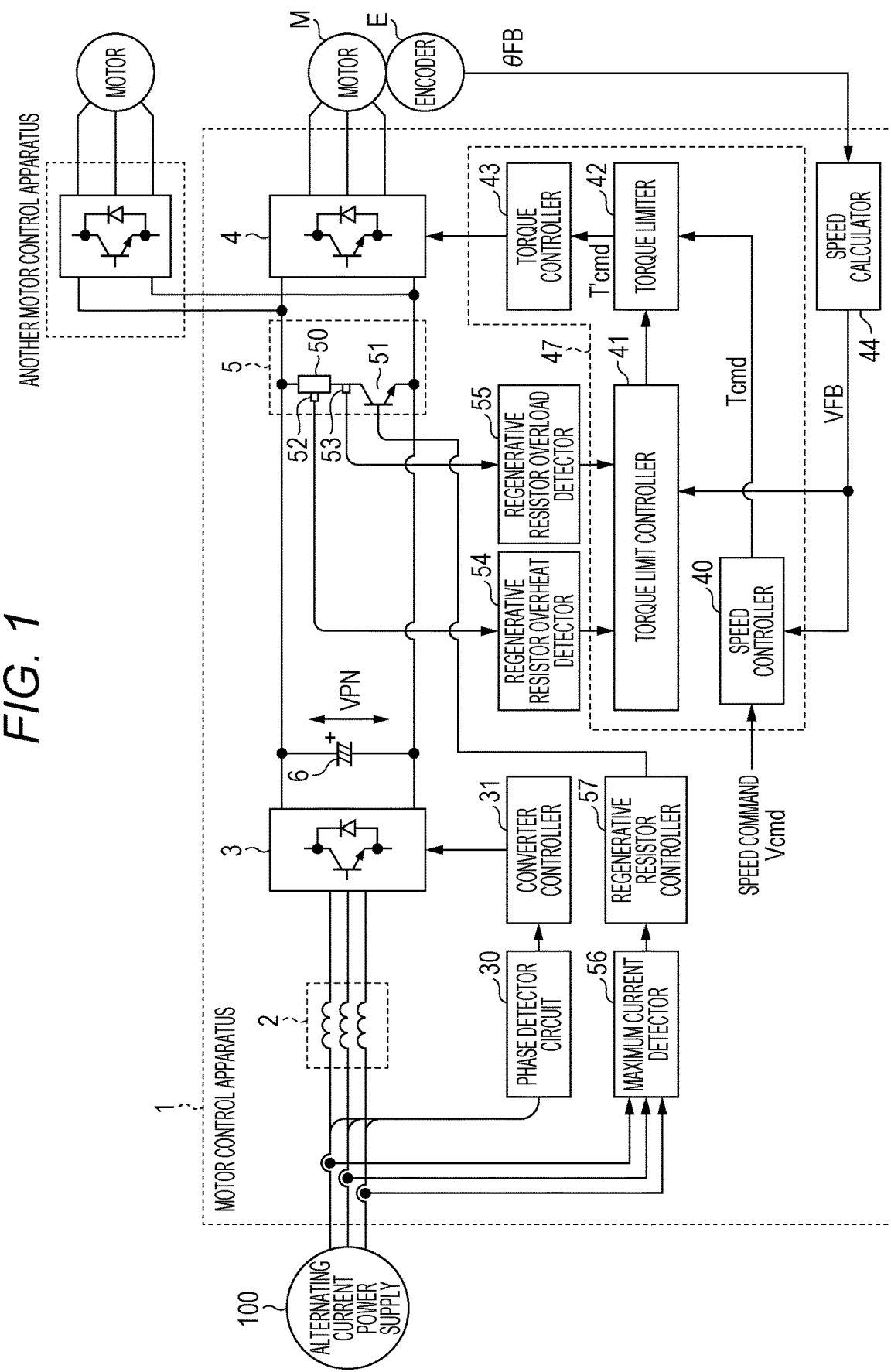
FIG. 1 is a block diagram illustrating the configuration of a motor control apparatus according to a first embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A motor control apparatus according to one aspect of the present disclosure includes: a converter circuit; an inverter circuit; a current detector; a regenerative resistor; a regenerative resistor controller; and a control device, in which: the converter circuit is configured to convert alternating current from an alternating current power supply to direct current, convert regenerative direct current from the inverter circuit to regenerative alternating current, and further supply the regenerative alternating current to the alternating current power supply: the inverter circuit is configured to convert the direct current to alternating current for driving a motor, and convert regenerative alternating current from the motor to the regenerative direct current; the current detector is configured to be capable of detecting the regenerative alternating current to be supplied to the alternating current power supply; the regenerative resistor is configured to pass a part of the regenerative direct current from the inverter circuit therethrough; the regenerative resistor controller is configured to control the passage of the regenerative direct current through the regenerative resistor; the control device is configured to control drive of the motor; and the motor control apparatus is configured to cause the regenerative resistor controller to pass the regenerative direct current thorough the regenerative resistor upon the current detector detecting that the regenerative current exceeds a predetermined current value, and cause the control device to limit torque in a regeneration direction of the motor, or a rate of change of a speed command in the regeneration direction of the motor upon at least one of the temperature or power consumption of the regenerative resistor exceeding a threshold.

In the motor control apparatus according to the embodiment, it is possible to restrain a decelerating time from increasing as much as possible to continue normal operation as long as possible also when instantaneous regenerative power that exceeds a maximum rated value for power regeneration is supplied from the motor. Hence, it is possible to restrain the takt time of a machine from increasing as much as possible.

Embodiments of the present disclosure are described hereinafter with reference to the drawings. Note that the description of configurations having the same reference numerals as those of configurations that have already been described in the detailed description is omitted for the sake of convenience.

First Embodiment

FIG. 1 is a block diagram illustrating the configuration of a motor control apparatus according to a first embodiment of the present disclosure. As illustrated in FIG. 1, many inverters are connected to one converter when a motor control apparatus 1 is used. In other words, the motor control apparatus 1 includes an alternating current reactor 2, a converter circuit 3 having a power regeneration function, a power storage device 6, a regenerative resistor circuit 5, and an inverter circuit 4. Moreover, the motor control apparatus 1 includes a phase detector circuit 30, a converter controller 31, a maximum current detector 56, a regenerative resistor controller 57, a regenerative resistor overheat detector 54, a regenerative resistor overload detector 55, a speed calculator 44, and a control device 47.

The converter circuit 3 is a three-phase (phases r, s, and t) full bridge circuit. The converter circuit 3 includes six semiconductor switching elements. Each of the semiconductor switching elements includes, for example, an insulated-gate bipolar transistor (IGBT) and an anti-parallel freewheeling diode.

The inverter circuit 4 is a three-phase (phases u, v, and w) full bridge circuit. The inverter circuit 4 includes six semiconductor switching elements. Each of the semiconductor switching elements includes, for example, an IGBT and an anti-parallel freewheeling diode.

The regenerative resistor circuit 5 includes a regenerative resistor 50, a regenerative transistor 51, a temperature sensor 52, and a current sensor 53. The control device 47 includes a torque limit controller 41, a speed controller 40, a torque limiter 42, and a torque controller 43.

An encoder E illustrated in FIG. 1 is mounted on a motor M, and detects a position θFB of a rotor of the motor M. The detected position θFB of the rotor is inputted into the speed calculator 44. The speed calculator 44 performs a differential operation on the inputted position θFB of the rotor and calculates a motor speed VFB.

(Power Running Operation)

Power running operation based on the premise of regeneration operation being main operation of the embodiment is briefly described to describe the regeneration operation.

When the motor M performs the power running operation, the motor control apparatus 1 performs power conversion on three-phase alternating current power that is inputted from a three-phase alternating current power supply 100. The converted power is supplied to the motor M.

The three-phase alternating current that is inputted from the three-phase alternating current power supply 100 is inputted into the converter circuit 3 via the alternating current reactor 2.

In the converter circuit 3, the converter controller 31 controls and turns off the gates of the six semiconductor switching elements. Consequently, the converter circuit 3 that functions as a full-wave rectifier circuit (diode bridge circuit) converts, to direct current, the three-phase alternating current that is inputted from the three-phase alternating current power supply 100.

The power storage device 6 includes, for example, a smoothing capacitor, more specifically, an electrolytic capacitor. The power storage device 6 smooths and stores the direct current that is outputted by the converter circuit 3.

In the inverter circuit 4, the torque controller 43 drives the six semiconductor switching elements. Consequently, the inverter circuit 4 converts the direct current from the power storage device 6, or the direct current that is outputted by the converter circuit 3, to three-phase alternating current for driving the motor. The converted current is supplied to the motor M.

A speed command Vcmd and the motor speed VFB are inputted into the speed controller 40. The speed controller 40 then performs PI control on the speed, and outputs a torque command Tcmd.

The torque command Tcmd is inputted into the torque limiter 42 from the speed controller 40. When a torque limit command is further inputted into the torque limiter 42 from the torque limit controller 41, the torque limiter 42 limits the torque command Tcmd based on the torque limit command. The torque limiter 42 then calculates and outputs a torque command T'cmd. On the other hand, when a torque limit command is not inputted from the torque limit controller 41, the torque limiter 42 outputs the torque command Tcmd as it is as the torque command T'cmd.

The torque controller 43 performs current control or PWM control in such a manner that the motor outputs torque in accordance with the torque command T'cmd that is inputted from the torque limiter 42. At this point in time, the torque controller 43 drives the six semiconductor switching elements of the inverter circuit 4.

(Regeneration Operation)

When the motor M regenerates power, the motor control apparatus 1 performs power conversion on the power that is inputted from the motor M. The converted regenerative power is outputted to the three-phase alternating current power supply 100.

The power storage device 6 smooths and stores the direct current that is outputted from the inverter circuit 4.

The phase detector circuit 30 detects the phase of the three-phase alternating current power supply 100. When a voltage value VPN of the power storage device 6 is equal to or greater than a predetermined value, the converter controller 31 sequentially controls and turns on the gates of the six semiconductor switching elements based on the phase of the three-phase current detected by the phase detector circuit 30 (120 degree conduction method).

Consequently, in the converter circuit 3, the power of the power storage device 6 is converted to three-phase alternating current for regeneration. The current then flows through each phase of the three-phase alternating current power supply 100. In this manner, current is supplied to the three-phase alternating current power supply 100.

The maximum current detector 56 detects the maximum value of the three-phase alternating current flowing between the three-phase alternating current power supply 100 and the alternating current reactor 2. When the maximum value of the current is equal to or greater than a predetermined value, the regenerative resistor controller 57 controls and turns on the gate of the regenerative transistor 51 of the regenerative resistor circuit 5. In this manner, a part of the regenerative direct current is passed through the regenerative resistor 50. The regenerative transistor 51 includes, for example, an IGBT.

The resistance value of the regenerative resistor 50 is denoted by R. The maximum value of instantaneous regenerative power that is regenerated by the motor M is denoted by PM. The maximum rated value of the regenerative power that is regenerated by the converter circuit 3 is denoted by PS. These values and the voltage value VPN of the power storage device 6 satisfy a relationship presented below by equation 1.

$$R \le VPN^2/(PM-PS) \quad \text{(Equation 1)}$$

Consequently, even if the instantaneous regenerative power that is regenerated by the motor M exceeds the maximum rated value PS of the power regenerated by the converter circuit, an excess of the power is absorbed by the regenerative resistor 50. Therefore, it is possible to avoid breakdown of circuit components (such as the semiconductor switching elements of the converter circuit 3) in the motor control apparatus 1 due to overcurrent of the regenerative current. As a result, it is possible to drive the motor M without imposing a torque limit on the motor M.

The temperature sensor 52 detects the temperature of the regenerative resistor 50. The regenerative resistor overheat detector 54 determines whether or not the temperature of the regenerative resistor 50 detected by the temperature sensor 52 exceeds a predetermined threshold. If the temperature of the regenerative resistor 50 exceeds the predetermined threshold, the regenerative resistor overheat detector 54 notifies the torque limit controller 41 of overheating of the regenerative resistor. The predetermined threshold is set at a value slightly lower than a detection value of a regenerative resistor overheat abnormality.

Moreover, the current sensor 53 detects the value of a current flowing through the regenerative resistor 50. The regenerative resistor overload detector 55 calculates power consumption of the regenerative resistor 50 from the value of the current flowing through the regenerative resistor 50, the value being detected by the current sensor 53. The regenerative resistor overload detector 55 then determines whether or not the calculated power consumption exceeds a predetermined threshold of a regenerative resistor overload. If the power consumption of the regenerative resistor 50 exceeds the predetermined threshold of the regenerative resistor overload, the regenerative resistor overload detector 55 notifies the torque limit controller 41 of the regenerative resistor overload. The predetermined threshold is set at a value slightly lower than a detection value of a regenerative resistor overload abnormality. Note that the power consumption of the regenerative resistor 50 may be calculated by detecting the ON or OFF state of the regenerative resistor by use of a voltage sensor.

If being notified of at least one of the regenerative resistor overheat or regenerative resistor overload, the torque limit controller 41 detects a rotation direction of the motor M based on the motor speed VFB calculated by the speed calculator 44. The torque limit controller 44 then calculates and outputs a toque limit command that limits the torque of the motor M in a regeneration direction.

Specifically, when the rotation direction of the motor M is, for example, a clockwise (CW) direction, torque in a counterclockwise (CCW) direction being the regeneration direction is limited. Similarly, when the motor M rotates in the CCW direction, toque in the CW direction being the regeneration direction is limited. The torque limit value is set in such a manner that the temperature or overload of the regenerative resistor does not increase when the motor is operated with the limited torque in the regeneration direction.

The torque limiter 42 limits the torque command Tcmd that is inputted from the speed controller 40 based on the torque limit command that is inputted from the torque limit controller 41. In order to do so, the torque limiter 42 calculates and outputs the torque command T'cmd. The torque limiter 42 inputs the torque command T'cmd into the torque controller 43. The torque controller 43 then executes current control or PWM control based on the torque command T'cmd. At this point in time, the six semiconductor switching elements of the inverter circuit 4 are driven.

As described above, when the instantaneous regenerative power that is regenerated by the motor M exceeds the maximum rated value PS of the power regenerated by the converter circuit, an excess of the power can be absorbed by the regenerative resistor 50. Moreover, when the regenerative resistor overheat or regenerative resistor overload of the regenerative resistor 50 is notified, the overheat abnormality or overload abnormality of the regenerative resistor can be avoided by limiting the torque in the regeneration direction. Consequently, also when the instantaneous regenerative power that exceeds the maximum rated value of power regeneration is regenerated by the motor, it is possible to continue normal operation without increasing the decelerating time until the regenerative resistor overheat or regenerative resistor overload of the regenerative resistor 50 is notified. Moreover, also after the regenerative resistor overheat or regenerative resistor overload of the regenerative resistor 50 is notified, it is possible to perform normal operation in a power running direction. Hence, the operation becomes slow in the regeneration direction due to the torque limit, but a situation where the regenerative resistor that has detected an abnormality stops the operation can be avoided. Consequently, it is possible to continue normal operation as long as possible without increasing the motor accelerating/decelerating time as much as possible. As a result, it is possible to restrain the takt time of a machine from increasing due to a torque limit on the motor M.

Second Embodiment

Figure 2:
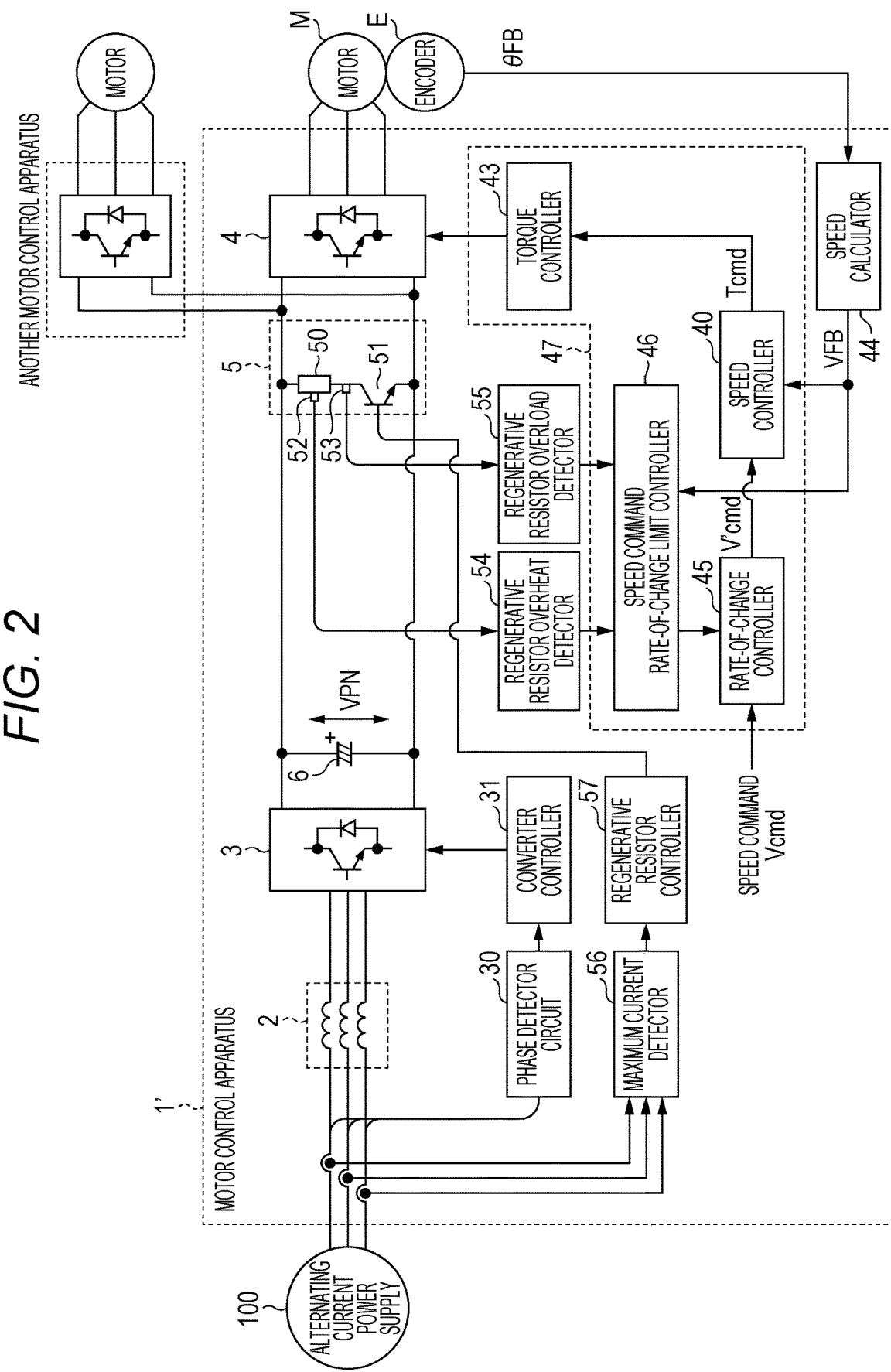
FIG. 2 is a block diagram illustrating the configuration of a motor control apparatus according to a second embodiment of the present disclosure.

FIG. 2 is a block diagram illustrating the configuration of a motor control apparatus according to a second embodiment of the present disclosure. As illustrated in FIG. 2, a motor control apparatus 1' has a multi-axis configuration that uses many inverters connected to one converter. More specifically, the motor control apparatus 1' includes an alternating current reactor 2, a converter circuit 3 having a power regeneration function, a power storage device 6, a regenerative resistor circuit 5, and an inverter circuit 4. Moreover, the motor control apparatus 1' includes a phase detector circuit 30, a converter controller 31, a maximum current detector 56, a regenerative resistor controller 57, a regenerative resistor overheat detector 54, a regenerative resistor overload detector 55, a control device 47, and a speed calculator 44. The regenerative resistor circuit 5 includes a regenerative resistor 50, a regenerative transistor 51, a temperature sensor 52, and a current sensor 53. The control device 47 includes a rate-of-change limit controller 46, a rate-of-change limiter 45, a speed controller 40, and a torque controller 43.

Note that configurations other than the configurations of the rate-of-change limit controller 46, the rate-of-change limiter 45, the speed calculator 44, and the speed controller 40 are the same as those of the first embodiment. Hence, the description of the other configurations is not repeated. Moreover, in the second embodiment, only the regeneration operation is described. The power running operation in the second embodiment is similar to that of the first embodiment. Hence, the description of the power running operation is not repeated.

(Regeneration Operation)

When being notified of regenerative resistor overheat by the regenerative resistor overheat detector 54, or notified of overload by the regenerative resistor overload detector 55, the rate-of-change limit controller 46 detects a rotation direction of a motor M based on a motor speed VFB calculated by the speed calculator 44. The rate-of-change limit controller 46 then calculates and outputs a rate-of-change limit command that limits the rate of change of a speed command Vcmd in a regeneration direction of the motor M. A limit value of the rate of change of the speed command Vcmd is set at a limit value that does not increase the temperature or overload of the regenerative resistor when power is regenerated by limiting the rate of change of the speed command Vcmd.

The rate-of-change limiter 45 limits the speed command Vcmd that is inputted, based on the change-of-rate limit command that is inputted from the rate-of-change limit controller 46. In this manner, the rate-of-change limiter 45 calculates and outputs a speed command V'cmd. Note that when the rate-of-change limit command is not inputted from the rate-of-change limit controller 46, the rate-of-change limiter 45 outputs the speed command Vcmd that is inputted, as it is, as the speed command V'cmd.

The speed controller 40 calculates and outputs a torque command Tcmd based on the speed command V'cmd and motor speed VFB that are inputted.

As described above, when instantaneous regenerative power that is regenerated by the motor M exceeds a maximum rated value PS of power regenerated by the converter circuit, an excess of the power can be absorbed by the regenerative resistor 50 until regenerative resistor overheat or regenerative resistor overload is notified. Moreover, when the regenerative resistor overheat or regenerative resistor overload of the regenerative resistor 50 is notified, the rate of change of the speed command Vcmd in the regeneration direction is limited. In this manner, it is possible to avoid overheat or overload of the regenerative resistor.

Consequently, it is possible to restrain the takt time of a machine from increasing due to a rate-of-change limit of a speed command of the motor M as much as possible while avoiding breakdown of a circuit component in the motor control apparatus 1' due to excessive regenerative current.

Up to this point the embodiments of the present disclosure have been described. However, it is needless to say that the technical scope of the embodiments should not be construed in a limited manner by the above detailed description. The embodiments that have been described are mere examples. Those skilled in the art understand that the embodiments described above can be modified in various manners within the scope described in the claims. The technical scope of the embodiments should be determined based on the scope described in the claims and the scope of equivalents thereof.

For example, in the first and second embodiments, the configuration is presented which limits a torque command or the rate of change of a speed command in the regeneration direction only on an axis having the largest output, such as a principal axis, of the multiple axes. However, a torque command, or the rate of change of a speed command, in the regeneration direction of another axis may also be limited. Moreover, the converter circuit 3 may be based on not the 120 degree conduction method but the PWM control method. Moreover, the three-phase alternating current power supply 100 illustrated in FIG. 1 may be a single-phase alternating current power supply. Moreover, the temperature of the regenerative resistor 50 may be estimated instead of detecting the temperature of the regenerative resistor 50.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor control apparatus comprising: a converter circuit; an inverter circuit; a current detector; a regenerative resistor; a regenerative resistor controller; and a control device, wherein the converter circuit is configured to convert alternating current from an alternating current power supply to direct current, convert regenerative direct current from the inverter circuit to regenerative alternating current, and further supply the regenerative alternating current to the alternating current power supply, the inverter circuit is configured to convert the direct current to alternating current for driving a motor, and convert regenerative alternating current from the motor to the regenerative direct current, the current detector is configured to be capable of detecting the regenerative alternating current to be supplied to the alternating current power supply, the regenerative resistor is configured to pass a part of the regenerative direct current from the inverter circuit therethrough, the regenerative resistor controller is configured to control the passage of the regenerative direct current through the regenerative resistor, the control device is configured to control drive of the motor, and the motor control apparatus is configured to cause the regenerative resistor controller to pass the regenerative direct current through the regenerative resistor upon the current detector detecting that the regenerative current exceeds a predetermined current value, and cause the control device to limit torque in a regeneration direction of the motor upon at least one of the temperature or power consumption of the regenerative resistor exceeding a threshold.

2. The motor control apparatus according to claim 1, wherein the control device does not limit the torque in the regeneration direction of the motor, or a rate of change of the speed command in the regeneration direction of the motor, upon the at least one of the temperature or power consumption of the regenerative resistor not exceeding the threshold.

3. The motor control apparatus according to claim 1, further comprising a power storage device configured to store the direct current, wherein
a resistance value of the regenerative resistor satisfies a relationship of $R \leq VPN^2/(PM-PS)$ where R is the resistance value of the regenerative resistor, VPN is a voltage value of the power storage device, PM is a maximum value of instantaneous regenerative power that is regenerated by the motor, and PS is a maximum rated value of regenerative power that is regenerated by the converter circuit.

4. The motor control apparatus according to claim 2, further comprising a power storage device configured to store the direct current, wherein
a resistance value of the regenerative resistor satisfies a relationship of $R \leq VPN^2/(PM-PS)$ where R is the resistance value of the regenerative resistor, VPN is a voltage value of the power storage device, PM is a maximum value of instantaneous regenerative power that is regenerated by the motor, and PS is a maximum rated value of regenerative power that is regenerated by the converter circuit.

5. The motor control apparatus according to claim 1, wherein the threshold is set at a value slightly lower than a detection value of a regenerative resistor overheat abnormality, or the threshold is set at a value slightly lower than a detection value of a regenerative resistor overload abnormality.

6. The motor control apparatus according to claim 1 further comprising:
a temperature sensor configured to detect the temperature of the regenerative resistor; and
a regenerative resistor overheat detector configured to determines whether or not the temperature of the regenerative resistor exceeds the threshold.

7. The motor control apparatus according to claim 1 further comprising:
a current sensor configured to detect a current flowing through the regenerative resistor; and
a regenerative resistor overload detector configured to
calculates the power consumption of the regenerative resistor based on the current flowing through the regenerative resistor; and
determines whether or not the calculated power consumption exceeds the threshold.

* * * * *